US006587053B1

(12) United States Patent
Lee

(10) Patent No.: US 6,587,053 B1
(45) Date of Patent: Jul. 1, 2003

(54) WIRELESS KEY INPUT PROCESSING APPARATUS FOR A DISPLAY APPARATUS USING A UNIVERSAL SERIAL BUS

(75) Inventor: Sang-Hae Lee, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/255,783

(22) Filed: Feb. 23, 1999

(30) Foreign Application Priority Data

Feb. 23, 1998 (KR) .......................................... 1998-5634

(51) Int. Cl.[7] ................................................. H04Q 1/00
(52) U.S. Cl. ..................... 340/825.72; 341/176; 341/22; 359/142; 710/63
(58) Field of Search ....................... 340/825.69, 825.72; 341/175, 176, 22; 359/142; 710/63; 345/161

(56) References Cited

U.S. PATENT DOCUMENTS

| 5,109,222 | A | * | 4/1992 | Welty .................... 340/825.72 |
| 5,504,483 | A | * | 4/1996 | Hoffmann et al. ............ 341/22 |
| 5,563,631 | A | * | 10/1996 | Masunaga ................... 345/161 |
| 5,579,496 | A | * | 11/1996 | Van Steenbrugge ......... 348/734 |
| 5,845,151 | A | * | 12/1998 | Story et al. .................... 710/22 |
| 6,104,334 | A | * | 8/2000 | Allport ........................ 341/175 |
| 6,111,677 | A | * | 8/2000 | Shintani et al. ............. 348/734 |
| 6,119,190 | A | * | 9/2000 | Garney ........................ 710/310 |
| 6,151,645 | A | * | 11/2000 | Young et al. ................. 710/63 |
| 6,185,641 | B1 | * | 2/2001 | Dunnihoo ................... 370/402 |

* cited by examiner

Primary Examiner—Brian Zimmerman
(74) Attorney, Agent, or Firm—Robert E. Bushnell, Esq.

(57) ABSTRACT

A key signal from a wireless keyboard or wireless mouse is received by a display apparatus and is transmitted to a personal computer (PC) through a USB line, and a process signal is received from the PC to control peripheral equipment connected to the display apparatus. The wireless key input processing apparatus includes: a key input unit having an infrared transmitting unit for converting a signal inputted by a user through a wireless keyboard and/or wireless mouse to an infrared signal, and for transmitting it; a display unit for receiving the wireless key signal outputted from the transmitting unit, converting it to USB information, outputting the converted information through the USB line as upstream data; and a PC for identifying the key input corresponding to information from the keyboard and/or mouse as recorded on a ROM BIOS upon receipt of the USB information from the display unit.

19 Claims, 3 Drawing Sheets

WIRELESS KEY INPUT PROCESSING APPARATUS FOR A DISPLAY APPARATUS USING A UNIVERSAL SERIAL BUS

CLAIM OF PRIORITY

This application makes reference to, incorporates the same herein, and claims all benefits accruing under 35 U.S.C. §119 from an application for A WIRELESS KEY INPUT PROCESSING APPARATUS OF DISPLAY APPARATUS USING USB earlier filed in the Korean Industrial Property Office on the 23$^{rd}$ of February 1998 and there duly assigned Serial No. 5634/1998.

BACKGROUND OF THE INVENTION

1. Field of the Invention

If The present invention relates, in general, to a wireless key input processing apparatus for a display apparatus using a universal serial bus(hereinafter, a "USB") and, more particularly, to a wireless key input processing apparatus for a display apparatus using a USB in which a key signal from a wireless key board or wireless mouse is received by a display apparatus, and is transmitted to a personal computer (hereinafter, a "PC") through a USB line, and in which a process signal is received from the PC to control peripheral equipment connected to the display apparatus.

2. Related Art

Recently, as a new type of computer environment (such as a multi-media computer or home network) and a new communication environment focusing on a computer have become more popular, peripheral equipment which are subject to be controlled by the computer have rapidly increased. Accordingly, in consideration of the fact that the current 1:1 manner of connecting a computer and peripheral equipment has reached a saturation condition in view of the prevalence or abundance of peripheral equipment, a new way of connecting a computer and peripheral equipment has been sought, led by business concerns relating to computers, telephones and monitors. As a result, a USB for transmitting middle and low-speed data, and an IEEE1394 for transmitting high speed data, have emerged as a new communication protocol for the computer.

As various peripheral equipment attached to a PC have increased with an increase in applied programs, the limited number of PC slots has been exceeded. Moreover, as the connectors for peripheral equipment of different shapes have become uniform, a new communication protocol based on the concept of hot plugging or hot plug-and-play is being supported by PC manufacturers and phone service companies in order to attain convenience in the user's PC operation.

The USB is applied to the middle and low-speed equipment for which the data transmission speed is below 12 (Mbps), such as various modems, printers, joysticks, mouse devices, keyboards and scanners. The IEEE1394 is applied to high speed equipment for which the data transmission speed is around 100–400 (Mbps), such as a digital camera, video cassette tape recorder and optical disk reproducer.

Meanwhile, as computer environments vary, larger display apparatus (more than 20 inch or 30 inch) as well as the popular 14 or 15 inch display apparatus have tended to increase, and the key input devices (such as the keyboard and mouse) have become wireless for the user's convenience.

As described in more detail below, when contemporary key input processing devices, such as the wireless keyboard or wireless mouse, are used to control peripheral equipment of a computer system, slow transmission speeds make it difficult to process substantial amounts of data in real time. This is especially true in the case of computer systems employing new types of multimedia, such as the home network. Thus, peripheral equipment are not easily operated or controlled, thereby adversely affecting reliability of the overall system.

SUMMARY OF THE INVENTION

An object of the present invention is to provide a wireless key input processing apparatus for a display apparatus using a USB which is capable of receiving a key signal from a wireless keyboard or wireless mouse operated by a user with the display apparatus.

Another object of the present invention is to provide a wireless key input processing apparatus for a display apparatus using a USB in which a key signal from a wireless keyboard or wireless mouse received by the display apparatus operated by a user is transmitted to a PC through a USB line, and in which peripheral equipment connected to the display apparatus are controlled upon receipt of a process signal from the PC.

In order to attain the above object, there is provided a wireless key input processing apparatus for a display apparatus using a USB, including: a key input unit having an infrared transmitting unit for converting a key signal, inputted by a user through a wireless keyboard and/or a wireless mouse, to an infrared signal, and transmitting it wirelessly; a display unit for receiving the wireless infrared signal outputted from the infrared transmitting unit, converting it to USB information, and outputting the converted USB information through a USB line as upstream data; and a PC for identifying key input data corresponding to information on a keyboard and mouse as recorded on a read-only memory basic input/output system (ROM BIOS) upon receipt of the USB information from the display unit and, when an accurate signal is inputted, outputting an identifying signal reporting that fact and, at the same time, outputting a corresponding key input process signal to the display unit.

Additional advantages, objects and other features of the invention will be set forth in part in the description which follows and, in part, will become apparent to those having ordinary skill in the art upon examination of the following, or may be learned from practice of the invention. The objects and advantages of the invention may be realized and attained as particularly pointed out in the appended claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A preferred embodiment of the present invention will now be described with reference to the accompanying drawings.

Figure 1:
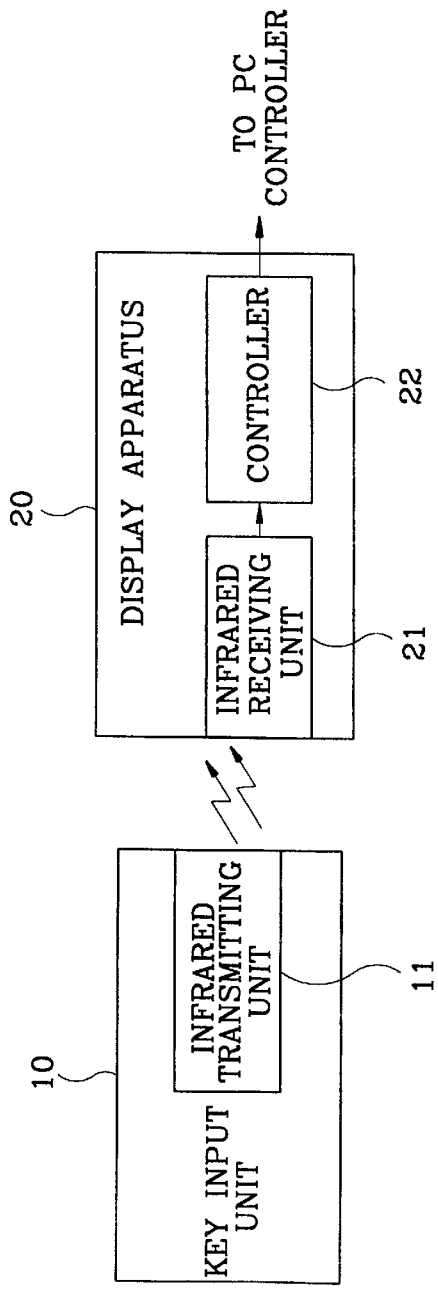
FIGS. 1 and 2 are schematic block diagrams, each illustrating a key input processing unit such as a wireless keyboard or a wireless mouse.

FIG. 1 is a block diagram illustrating a key input processing apparatus, such as wireless keyboard or wireless mouse.

As shown in this drawing, a key input unit 10 is an input unit of a wireless keyboard and a wireless mouse to which data is inputted by a user. The key input unit 10 is provided with an infrared transmitting unit 11. A display apparatus 20, displaying an image signal applied from an external source of the PC, includes an infrared receiving unit 21 for receiving infrared ray information outputted from the infrared transmitting unit 11, and a controller 22 for converting the data inputted from the infrared receiving unit 21 and for outputting the converted data to a PC controller (not shown) in an I$^2$C (Inter-integrated-circuit) type.

In the above-described case, wherein the infrared receiving unit 21 is provided in the display Is unit 20, when the infrared receiving unit 21 of the display unit 20 receives the wireless key signal inputted by a user, the received wireless key signal is applied to the PC controller through a keyboard/mouse output port (not shown) installed in the display apparatus 20 so as to be processed.

Figure 2:
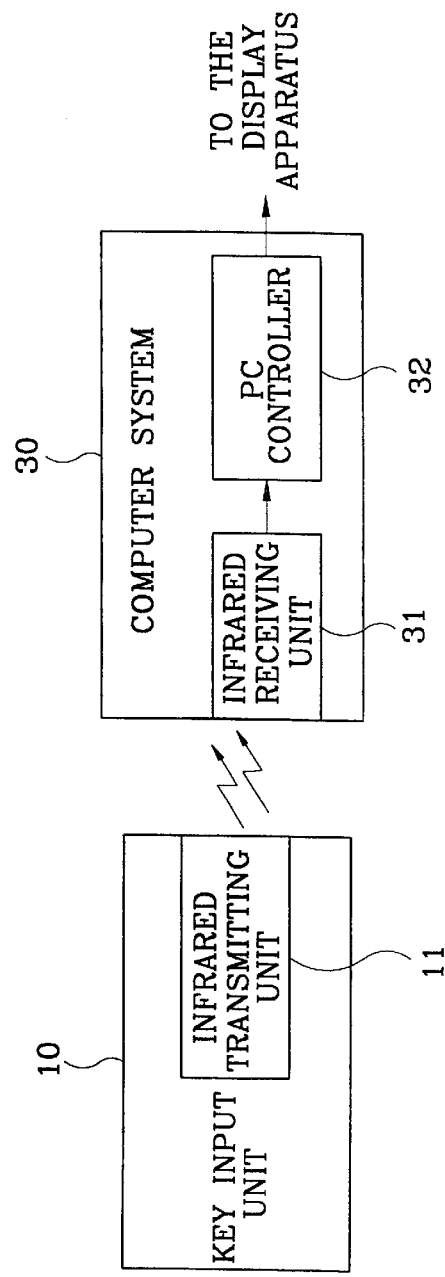

As a modification to the arrangement of FIG. 1, the key input processing apparatus, such as the wireless keyboard or wireless mouse, may have a construction as shown in FIG. 2.

Referring to FIG. 2, the infrared receiving unit 31 is provided in a computer system 30 so that the infrared transmitting unit 11 of the key input unit 10 receives the wireless key signal inputted by the user and sends it to infrared receiving unit 31, which applies it directly to the PC controller 32.

That is, since the infrared receiving unit 31 is provided in the computer system 30, the wireless key signal inputted by the user is received by the infrared receiving unit 31 of the computer system 30, and the received wireless key signal is then applied directly to the PC controller 32 to be processed.

However, when peripheral equipment are controlled by using a key input processing apparatus such as the wireless keyboard or the wireless mouse, as described above, since the transmitting speed is very slow, it is difficult to process a good amount of data in real time in a computer environment employing the new type of multimedia, such as a home network. Thus, operation of the various peripheral equipment connected to the computer system is not easily performed, causing degradation in the reliability of the product.

Figure 3:
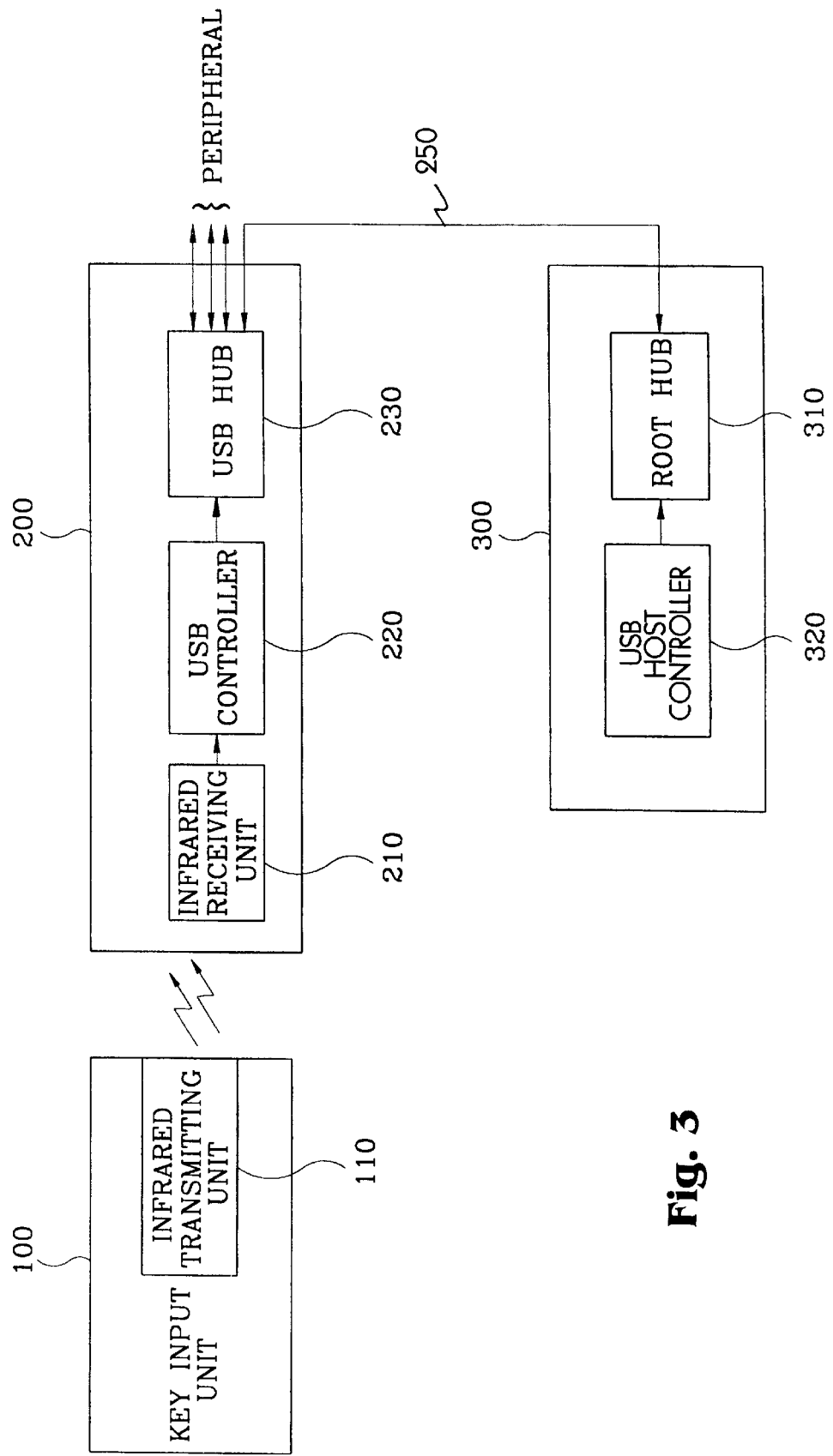
FIG. 3 is a schematic block diagram illustrating a wireless key input processing apparatus for a display apparatus using a USB in accordance with the present invention.

FIG. 3 is a schematic block diagram illustrating a wireless key input processing apparatus for a display apparatus using a USB in accordance with the present invention.

As shown in this drawing, an input unit for a wireless keyboard and a wireless mouse for inputting data by a user comprises a key input unit 100 which is provided with an infrared transmitting unit 110 for converting a key input signal by the user into an infrared information for output.

As a unit for displaying an image signal inputted from an external source, a display unit 200 includes: an infrared receiving unit 210 for receiving infrared information outputted from the infrared transmitting unit 110; a USB controller 220 for converting a key signal of the wireless keyboard or the wireless mouse, inputted from the infrared receiving unit 210, to USB information; and a USB hub 230 for outputting, as upstream data, the USB information outputted from the USB controller 220 to a PC 300 through a USB line 250.

The USB controller 220 deals with communication between any peripheral equipment (not shown) and the PC 300, and also information on connection of the peripheral equipment. In addition, the USB controller 220 transmits data between the peripheral equipment and the PC 300.

When data concerning the peripheral equipment is transmitted as upstream data, USB hub 230 transmits it to peripheral equipment which possibly requires the data as downstream data under the control of the USB controller 220, and also deals with classifying power source.

The peripheral equipment to be connected to the PC 300 comprises, for example, a printer, a MODEM, a scanner, an audio instrument, etc.

The PC 300 includes: a root hub 310 for receiving the USB information provided by the USB hub 230 through the USB line 250, and for outputting the USB information to a USB host controller 320; and USB host controller 320 for identifying an input key signal of the USB information inputted from the root hub 310 in consideration of information on the keyboard and the mouse as recorded at a ROM BIOS (not shown). If an accurate key signal has been inputted, USB host controller 320 outputs an identifying signal to report that fact and, at the same time, outputs a process signal corresponding to the input key signal so as to transmit it to the USB hub 230 of the display unit 200 through the root hub 310 as upstream data.

Figure 4:
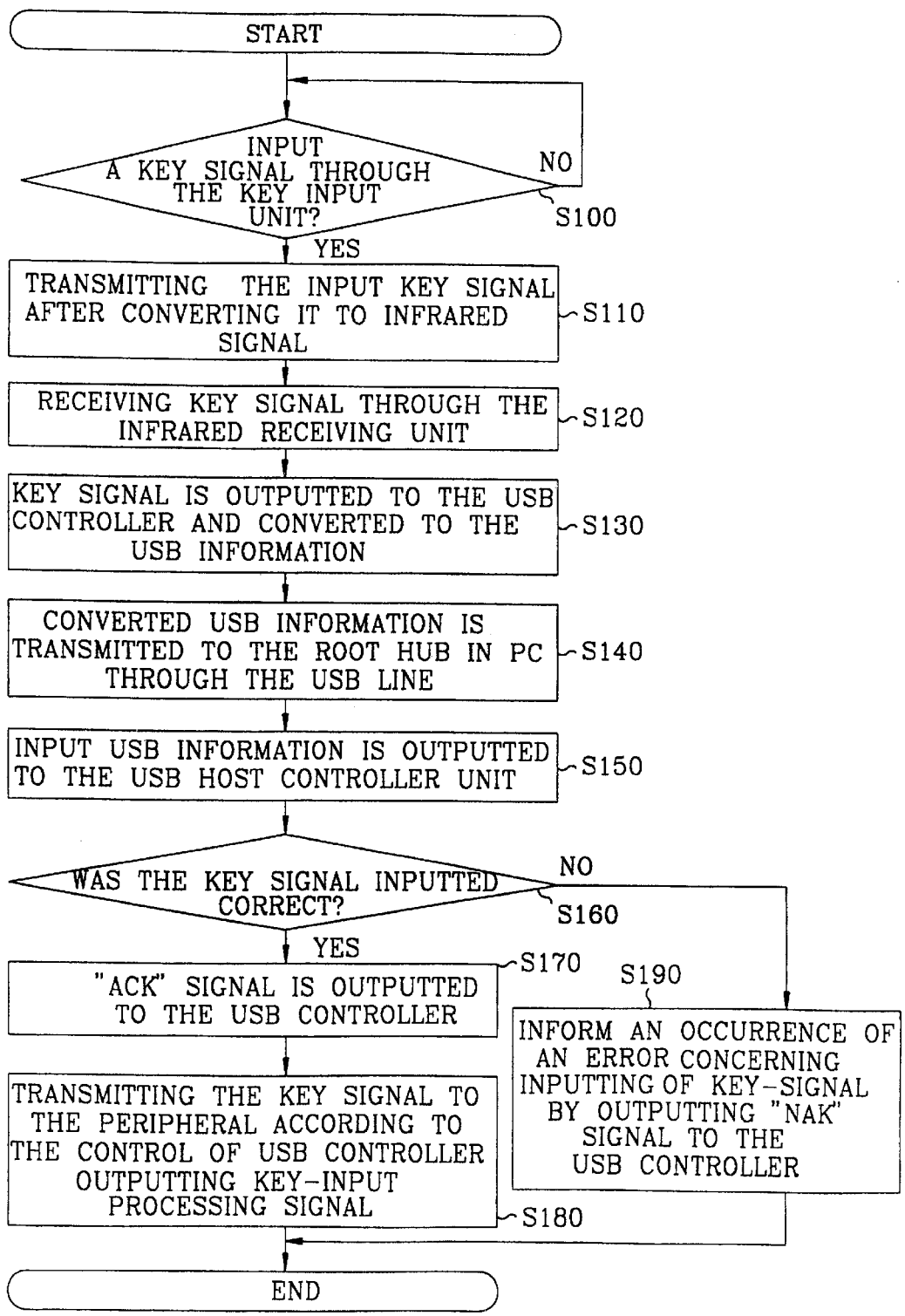
FIG. 4 is a flow chart illustrating the wireless key input process for the display apparatus using the USB in accordance with the present invention.

Operation of the wireless key input processing apparatus of the display apparatus using the USB in accordance with the present invention will now be described in detail with reference to FIG. 3 and FIG. 4.

When the user inputs a key signal through the key input unit 100, such as the wireless keyboard or the mouse(S100), the input key signal is converted to an infrared signal by the infrared transmitting unit 110 and is transmitted(S 110).

The wireless key signal transmitted by the infrared transmitting unit 110 provided in the key input unit 100 is received by the infrared receiving unit 210 provided in the front surface of the display unit 200(S120).

When the wireless key signal transmitted by the infrared transmitting unit 110 of key input unit 100 is received by the infrared receiving unit 210, the received wireless key signal is outputted to the USB controller 220, and is converted to USB information(S130).

In this connection, the process of being converted to USB information signifies that the wireless key signal inputted by the key input unit 100 is converted to data suitable to the USB communication protocol. The wireless key signal, thus converted to USB information and outputted is to the USB hub 230, is transmitted to the root hub 310 provided in the PC 300 through the USB line 250 as upstream data (S140).

Thereafter, the USB information transmitted to the root hub 310 by the USB hub 320 is applied to the USB host controller 320(S150). The USB host controller 320 converts the input USB information, and identifies the input wireless key signal from the user in consideration of information as recorded at the ROM BIOS so as to determine whether an accurate key signal has been input(S160)

Upon determination at step S160 that the key signal is normally or correctly inputted from the display unit 200, the USB host controller 320 outputs an "ACK" signal and transmits it to the USB controller 220 of the display unit 200 through the root hub 310(S170)

The USB host controller 320 outputs the key input process signal along with the "ACK" signal to the USB hub 230 of the display unit 200 as upstream data. Then, the USB controller 220 controls and transmits them as downstream data to the peripheral equipment as needed to enable the peripheral equipment to operate(S180).

Conversely, upon determination at step(S160) that the key signal is not normally or correctly inputted from the display unit 200, the USB host controller 320 outputs a "NAK" signal and transmits it to the USB controller 220 of the display unit 200 through the root hub 310 so as to report occurrence of an error concerning input of the wireless key signal by the user (S190)

As so far described, in the wireless key input processing apparatus of the present invention, when a wireless key signal from the wireless keyboard or wireless mouse is received in the display unit, it is transmitted to the PC 300 through the USB line 250, and then the peripheral equipment connected to the display unit 200 are controlled by the key signal process signal inputted from the PC 300 to the display unit 200. In this way, the data transmitting speed can be highly improved and a large amount of data can be processed for the user's convenience.

Although the preferred embodiment of the present invention has been disclosed for illustrative purposes, those skilled in the art will appreciate that various modifications, additions and substitutions are possible without departing from the scope and sprit of the invention, as recited in the accompanying claims.

What is claimed is:

1. A wireless key input processing apparatus for a display apparatus using a universal serial bus (USB), comprising:

a key input unit having an infrared transmitting unit for converting a key signal inputted by a user through at least one of a wireless keyboard and a wireless mouse to an infrared signal, and for transmitting the infrared signal wirelessly as a wireless key signal;

a display unit for receiving the wireless key signal transmitted by the infrared transmitting unit, for converting the wireless key signal to USB information, and for outputting the USB information through the USB as upstream data; and a personal computer (PC) for identifying a key input in consideration of information from said at least one of the wireless keyboard and the wireless mouse as recorded in a read-only memory and a basic input/output system (ROM BIOS) upon receipt of the USB information from the display unit;

wherein, when an accurate signal is inputted, said PC outputs an identifying signal reporting same and outputs a process signal corresponding to the key signal to the display unit.

2. The apparatus as claimed in claim 1, wherein the display unit includes:

an infrared receiving unit for receiving the infrared signal transmitted wirelessly by the infrared transmitting unit as the wireless key signal;

a USB controller for converting the wireless key signal received by the infrared receiving unit to the USB information; and a USB hub for outputting, as upstream data, the USB information from the USB controller to the PC through the USB, and for transmitting the process signal corresponding to the key signal received from the PC to peripheral equipment as downstream data under the control of the USB controller.

3. The apparatus as claimed in claim 2, wherein the PC includes:

a root hub for receiving the USB information outputted by the USB hub through the USB, and for outputting the USB information; and a USB host controller for receiving the USB information outputted by the root hub, and for identifying an input key signal of the USB information in consideration of the information from said at least one of the wireless keyboard and the wireless mouse as recorded in the ROM BIOS;

wherein, when the accurate key signal is inputted, the USB host controller outputs the identifying signal reporting same, and outputs the process signal corresponding to the key signal so as to transmit the process signal to the USB hub through the root hub as upstream data.

4. The apparatus as claimed in claim 1, wherein the PC includes:

a root hub for receiving the USB information from the display unit, and for outputting the USB information; and a USB host controller for receiving the USB information from the root hub, and for identifying the key input in consideration of the information from said at least one of the wireless keyboard and the wireless mouse as recorded in the ROM BIOS;

wherein, when the accurate key signal is inputted, the USB host controller outputs the identifying signal reporting same, and outputs the process signal corresponding to the key signal to the display unit.

5. A wireless key input processing apparatus for a display apparatus using a universal serial bus (USB), comprising:

key input means for converting a key signal inputted by a user to a wireless key signal, and for transmitting the wireless key signal;

display means for receiving the wireless key signal transmitted by the key input means unit, for converting the wireless key signal to USB information, and for outputting the USB information through the USB as upstream data; and a personal computer (PC) for identifying the key signal in consideration of information recorded in a read-only memory and a basic input/output system (ROM BIOS) of said PC upon receipt of the USB information from the display means;

wherein, when an accurate key signal is inputted, said PC outputs an identifying signal reporting same and outputs a process signal corresponding to the accurate key signal to the display means.

6. The apparatus as claimed in claim 5, wherein the display means includes:

a receiving unit for receiving the wireless key signal transmitted wirelessly by the input means;

a USB controller for converting the wireless key signal received by the receiving unit to the USB information; and a USB hub for outputting, as upstream data, the USB information from the USB controller to the PC through the USB, and for transmitting the process signal corresponding to the key signal received from the PC to peripheral equipment as downstream data under the control of the USB controller.

7. The apparatus as claimed in claim 6, wherein the PC includes:
- a root hub for receiving the USB information outputted by the USB hub through the USB, and for outputting the USB information; and
- a USB host controller for receiving the USB information outputted by the root hub, and for identifying the key signal from the USB information in consideration of the information recorded in the ROM BIOS;
- wherein, when the accurate key signal is inputted, the USB host controller outputs the identifying signal reporting same, and outputs the process signal corresponding to the accurate key signal so as to transmit the process signal to the USB hub through the root hub as upstream data.

8. The apparatus as claimed in claim 5, wherein the PC includes:
- a root hub for receiving the USB information from the display means, and for outputting the USB information; and
- a USB host controller for receiving the USB information from the root hub, and for identifying the key signal in consideration of the information recorded in the ROM BIOS;
- wherein, when the accurate key signal is inputted, the USB host controller outputs the identifying signal reporting same, and outputs the process signal corresponding to the accurate key signal to the display means.

9. The apparatus as claimed in claim 5, wherein said key input means comprises one of a wireless keyboard and a wireless mouse having an infrared transmitting unit.

10. The apparatus as claimed in claim 9, wherein said display means comprises an infrared receiving unit and a USB controller for converting the wireless key signal to the USB information, said wireless key signal comprising an infrared signal transmitted by said infrared transmitting unit.

11. The apparatuse as claimed in claim 5, wherein said display means comprises an infrared receiving unit and a USB controller for converting the wireless key signal to the USB information.

12. The apparatus as claimed in claim 1, wherein when an inaccurate signal is inputted, said PC outputs a NAK signal to said display unit, informing of occurrence of an error.

13. The apparatus as claimed in claim 2, wherein when an inaccurate signal is inputted, said PC outputs a NAK signal to said USB controller, informing of occurrence of an error.

14. The apparatus as claimed in claim 3, wherein when an inaccurate signal is inputted, said USB host controller outputs a NAK signal to said USB controller, informing of occurrence of an error.

15. The apparatus as claimed in claim 4, wherein when an inaccurate signal is inputted, said USB host controller outputs a NAK signal to said display unit, informing of occurrence of an error.

16. The apparatus as claimed in claim 5, wherein when an inaccurate signal is inputted, said PC outputs a NAK signal to said display means, informing of occurrence of an error.

17. The apparatus as claimed in claim 6, wherein when an inaccurate signal is inputted, said PC outputs a NAK signal to said USB controller, informing of occurrence of an error.

18. The apparatus as claimed in claim 7, wherein when an inaccurate signal is inputted, said USB host controller outputs a NAK signal to said USB controller, informing of occurrence of an error.

19. The apparatus as claimed in claim 5, wherein when an inaccurate signal is inputted, said USB host controller outputs a NAK signal to said display means, informing of occurrence of an error.

* * * * *